Patented Jan. 16, 1934

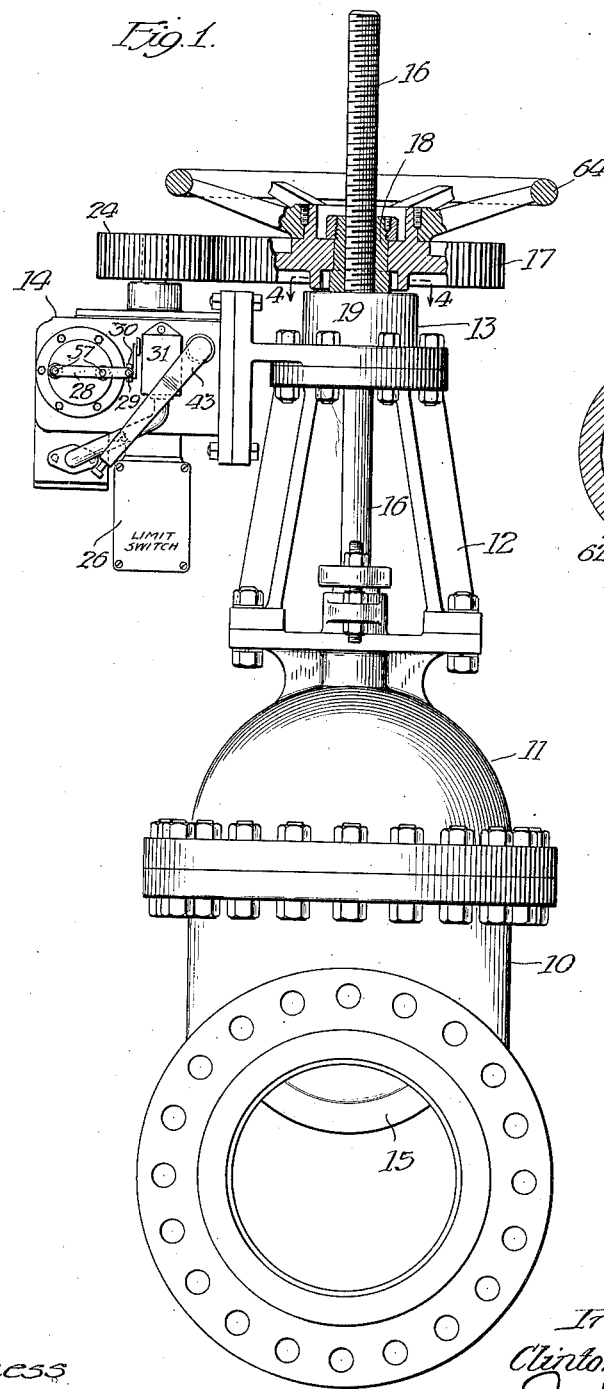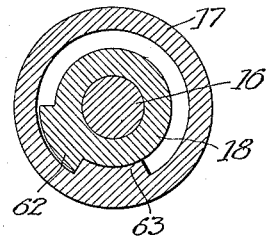

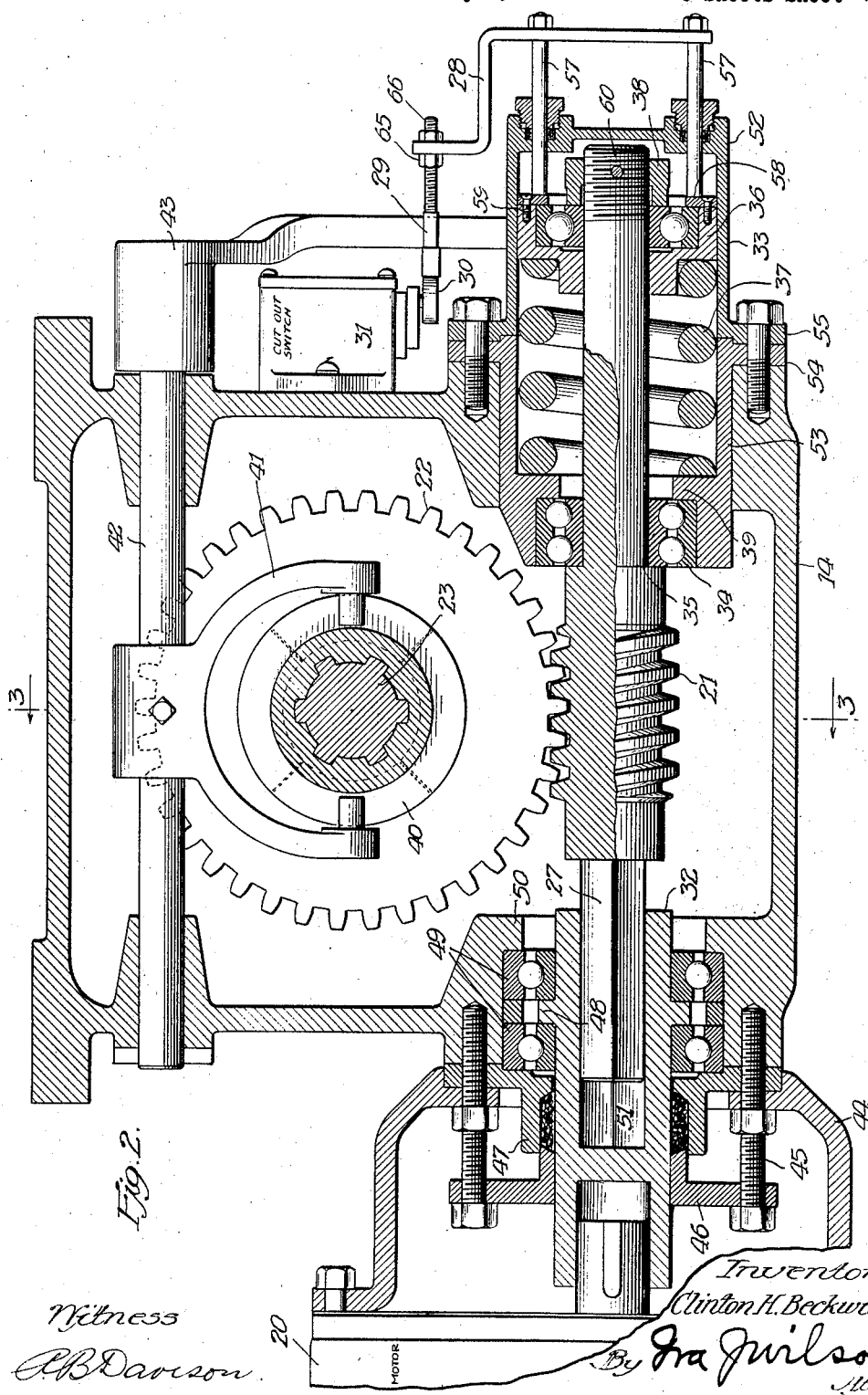

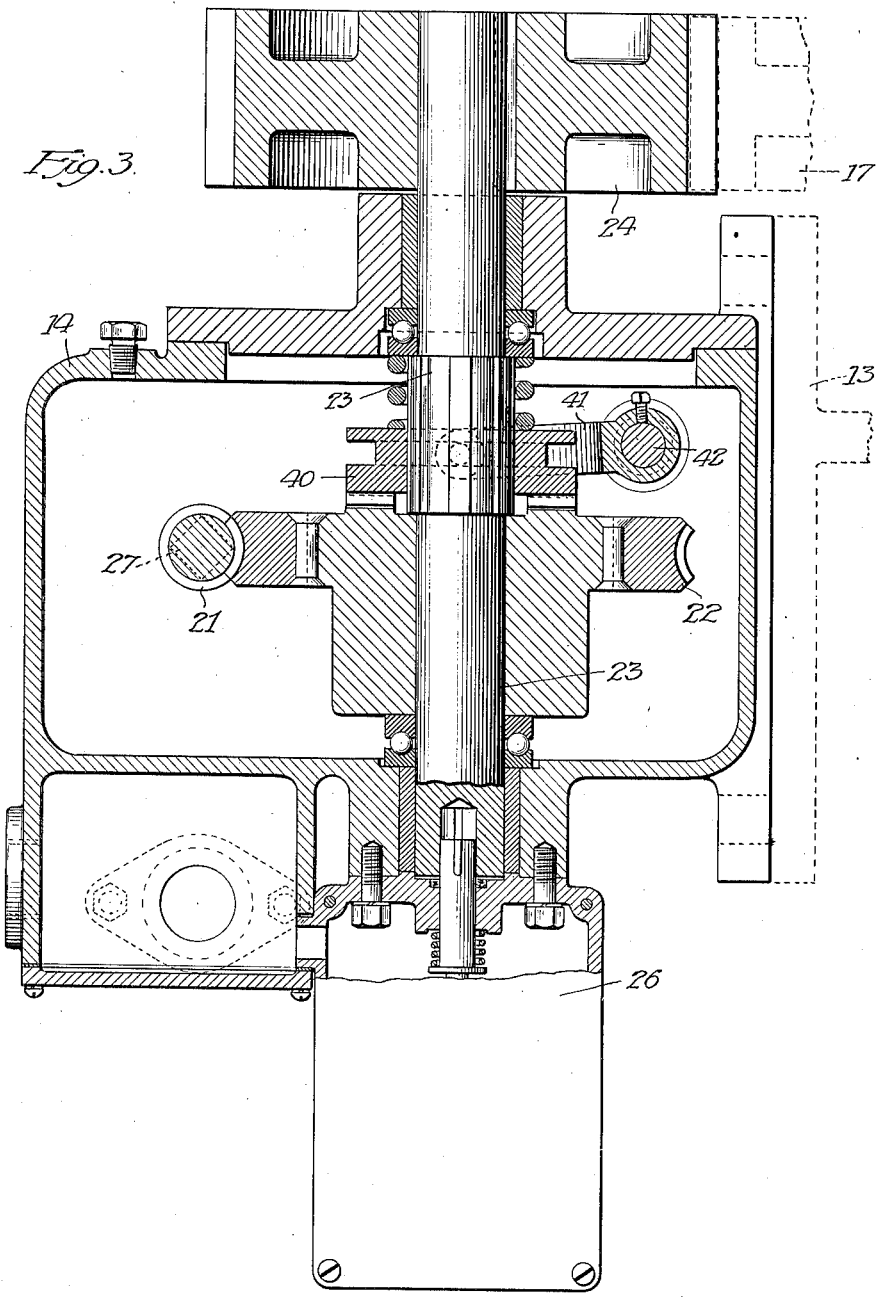

1,943,854

UNITED STATES PATENT OFFICE 1,943,854

MOTOR OPERATED VALVE

Clinton H. Beckwith, Geneva, Ill., assignor to Crane Co., Chicago, Ill., a corporation of Illinois Application May 2, 1929. Serial No. 359,795

3 Claims. (Cl. 137—139)

The invention relates to power operated valves and aims to provide a control whereby the power for actuating the valve is automatically rendered ineffective whenever excessive resistance is offered to further movement of the valve either by an obstruction presented to the valve which prevents its seating or by engagement of the valve with its seat.

A further object is to provide a control whereby the power for operating the valve is automatically rendered ineffective not only by excessive resistance to movement of the valve but also when the valve has reached a predetermined position in its travel. The invention further contemplates the provision of adjusting means for the control whereby the control may be regulated and set so as to cause the valve to function properly.

In addition to the above the invention contemplates utilization of one of the elements of the valve operating mechanism as a means for actuating a switch or other control for the power device, said element being movable to actuate said control upon the application of a resistance to the power device which is in excess of that normally presented by the valve and its operating mechanism.

A further object of the invention is the provision of means in combination with a structure such as that above referred to, whereby the driving connection between the power device and the valve may be disconnected to thereby allow the valve to be manually operated should this at any time be found necessary or desirable.

To more readily understand the application of this invention it should be assumed that a valve commonly known as the wedge gate type valve is installed in a pipe line in which there is present no pressure nor temperature and the valve disc is moved to its seat by applying a definite load to the handwheel at the instant of seating. If it is now attempted to open this valve under the same conditions, and the power applied on the handwheel to momentarily break the disc from its seat were measured, it would be found that at least 50% more power would have to be exerted than was applied in the seating operation. This excess power is traceable to the friction between the wedging surfaces of the disc and seats respectively.

The closing and opening of the same valve under pressure alone in the line without temperature will also give the same effect; therefore, the first point which must be considered in applying a motor control to a valve is the positive requirement of obtaining at least 50% more power in the opening of the valve so as to momentarily break the disc from the seat, than was applied in seating it. However, in actual practice with temperature conditions present, this comparatively slight increase in the amount of power required in opening the valve now increases several hundred times.

If the valve were now operated without allowing it to cool at least 50% more power is required to open it than was applied in seating it; however, if the valve remains closed for any length of time so that the temperature in the valve line drops 100 or more degrees it is found that due to the contraction of the valve a "pinch" action between the seat rings and the disc is obtained which provides a condition to the extent that when an attempt is made to open the valve, instead of requiring 50% excess power several hundred percent more power is required in order to momentarily break (or "crack") the disc from its seat than what was applied in its seating. In other words, the temperature differential between seating the valve and opening it, respectively, the greater the corresponding increase in power to break the disc from its seat, and at the same time due to the line temperature we find that a new condition has presented itself, for if the point at which the disc seated when the valve was cold had been measured, it would now be found that the valve disc had seated deeper in the body due to the expansion of the latter under the line temperature.

Therefore an additional point which must be considered in applying a motor control to a valve is the ability of its being able to insure a tightly seated valve each time the valve is closed regardless of line temperature variations. It is obvious therefore, that a definite mechanical limit switch cannot be used for this purpose, for if the latter were set to stop the motor at the point at which the gate seats, when no line temperature was present, it would stop the motor at the same point as when line temperature was present and because of the expansion of the body the valve would not be tight. Therefore, it is found that several conditions must be met in order to successfully operate the valve.

Various means have been employed in the past to compensate for the differences in the valve seating due to line temperature variations and to provide excess power in opening. One of these methods is disclosed in the Beckwith Patent #1,529,005 wherein the limit switch is set to trip at the point at which the disc started to lap the valve seats and with the tripping of this switch a time relay is set into operation, and at the same time a resistance is thrown into the motor circuit so as to reduce the speed and torque which it could develop. From this point on, the motor continues to close the valve gate to its seat under this reduced speed and torque which the valve seats when the motor momentarily stalls across the line until it is tripped off by means of the time relay. This system, while it functioned, yet was not satisfactory for the reason that the time for which the relay was set, varied due to voltage fluctuation, change in frequency, or successive operations of the valve caused a temperature rise in the relay.

So far, the action which takes place in seating a valve, has been dealt with. It is sufficient to say that this same action takes place at the upper limit in its opening movement if the valve disc is back seated in the bonnet. However, while the results are the same, the cause it is now found, is due to an entirely different reason, the explanation of which follows.

Assume that the valve is closed and that there is temperature present in the line. That portion of the stem which is in the bonnet is exposed directly to this temperature and therefore expands. It follows then that if the valve is opened and the disc is back seated in the bonnet, that portion of the stem which was in the bonnet is exposed to atmosphere between the gland and the top of the yoke, and inasmuch as the stem is securely fastened to the disc at one point and the threads between the stem and yoke sleeve form a second point, a rigidly locked stem is the result. If the valve remains in the open position for sufficient length of time to allow the stem to cool, the stem contracts and places a far greater strain between these two points than what was applied in back seating. To overcome this lock in order to close the valve, it requires far greater power than is necessary to break the disc from its seat under the most adverse conditions. In fact, there are numerous cases on record in which it was impossible to close the valve after the disc was back seated in the bonnet due to stem contraction.

In order to avoid this it is the practice that when opening a valve by hand if the disc is back seated, to reverse the rotation of the stem one or two turns before leaving it. This assures that the contraction of the stem will not cause a seizure. Thus another condition to meet for successful motor operation of a valve is that the disc must be stopped in its opening movement before it has back seated in the bonnet. No one to date has realized all of the requirements for the practical motor operation of a valve and incorporated these features in a single successful control, other than that of the invention of this application.

The invention has these and other objects all of which will be more readily understood when read in conjunction with the accompanying drawings which illustrate the invention as being electrically operated and controlled, it being obvious, however, that other motive power may be employed and that other changes and modifications may be resorted to without departing from the spirit of the appended claims forming a part hereof.

In the drawings:

Fig. 1 is an end view of a gate valve having a portion thereof shown in section for the purpose of illustration, Fig. 2 is a plan sectional view of a part of the mechanism for driving the valve, showing the means employed for arresting the movement of the valve when excessive resistance to its movement is encountered, Fig. 3 is a sectional view taken on line 3—3 of Fig. 2, and Fig. 4 is a sectional view taken on line 4—4 of Fig. 1.

The invention is shown and described as applied to a gate valve which includes the casing 10, the bonnet 11, and the standard 12 having the support or bracket 13 for supporting the casing 14 of the power device. The valve 15 slidably mounted in the valve casing is carried by a threaded stem 16 projecting above the casing. A gear 17 is adapted to rotate a nut 18 threaded upon the stem 16 and rotatably mounted upon the upper end of the bracket extension 19.

The power mechanism whereby opening and closing of the valve 15 is accomplished includes the motor 20 (Fig. 2), the worm 21, worm wheel 22, worm wheel shaft 23, and gear 24 which meshes with and drives the gear 17 which through the nut 18 threaded upon the stem 16 imparts longitudinal movement to the stem and the valve carried thereby.

A limit switch generally designated 26 is connected for operation with one end of the worm wheel shaft 23 and this limit switch is in electrical connection with the motor 20, which motor in the embodiment of the invention illustrated provides the means for driving the mechanism, it being evident that this particular motive power need not be adhered to. The limit switch may be of any desired construction but is preferably of the general character shown and described in the patent issued to me March 10, 1925, Patent No. 1,529,005, with the closing limiting apparatus omitted so that the motor will be brought to rest by this switch when the valve is moved to its open limit only. It is of course understood that the operation of the motor is controlled by a master switch with which the limit switch is in circuit, all of which is shown and described in my patent above referred to.

The shaft of the motor 20 is directly connected with the shaft 27 of the worm 21 and this worm shaft, worm and certain elements connected with the shaft are movable longitudinally relatively to the motor shaft and are also movable relatively to the worm wheel 22 when said wheel is held against rotation. This worm shaft has an arm 28 connected therewith for operation thereby and this arm supports an adjustable shoe 29, the shoe being provided for engagement with a control lever 30 which in the present instance is illustrated and defined as a switch lever of the control or cutout switch 31. This switch 31 is connected in circuit with the motor 20 and is provided to cut said motor out of the circuit and render it ineffective should an obstruction be presented or applied to the valve 15 which produces a resistance to the driving mechanism in excess of that normally offered by the valve and valve actuating mechanism.

The worm shaft 27 has one end slidably but non-rotatably mounted in the rotatable sleeve 32 which provides a slip coupling between the shaft of the motor 20 and said worm shaft and allows said worm and shaft to move endwise relatively to said sleeve. The worm shaft 27 has its opposite end rotatably and slidably mounted in a housing 33. One end of this housing has a thrust bearing 34 with which the shoulder 35 of the worm shaft 27 engages to limit movement of the worm shaft in this direction. The switch arm 28 is connected with the worm shaft 27 through the medium of a shaft bearing support 36 which is slidably but non-rotatably mounted in the housing 33. A coil spring 37 is mounted to react between one end of the housing 33 and the bearing support 36, these elements being held in associated relations to the shaft 27 by means of the adjusting nut 38 threaded onto the end of the shaft. This spring 37 normally maintains the shoulder 35 of the worm shaft in engagement with the thrust bearing 34, the latter and the adjacent end of the coil spring being in engagement with the flange 39 of the housing 33.

The mechanism thus far described is designed to operate the switch 31 to cut out the motor whenever excessive resistance to closing movement of the valve is encountered. Should the valve meet with some obstruction during its operation which interferes with its functioning in a normal manner the worm wheel 22 is prevented from rotating and if some provision were not made to cut out the motor under these conditions the windings of the motor would be burned out or some other part of the structure would be injured. When an obstruction is presented to the operation of the valve the worm wheel 22 is thereby held against rotation and with the switch 31 closed, it is evident that the motor 20 will tend to rotate the worm shaft and worm 21. This will cause the worm to climb the worm wheel 22 and move the worm shaft 27 and the element, such as the switch arm 28, in a direction toward the motor 20 against the action of the coil spring 37. This movement of this mechanism causes the switch trip shoe 29 to operate the lever 30 of the switch 31, opening the latter, cutting the motor 20 out of the circuit causing the motor to be brought to a rest thereby insuring against breakage or injury of any of the parts of the valve or the mechanism for operating said valve. Similarly when the valve is moved into engagement with its seat the resistance offered by the seat to further movement of the valve causes the worm 21 to travel longitudinally against the force of spring 37 to thereby, through arm 28 and shoe 29, throw the switch 31 and stop the motor.

The extent of opening movement of the valve is determined by the limit switch 26 connected for operation by the shaft 23 of the worm wheel 22. The limit switch in electrical connection with the motor 20 controls the motor to arrest operation thereof when the valve reaches its fully open position or any intermediate for which this switch is set.

A manually operable spring closed clutch provided with teeth cooperating with companion teeth on the upper face of the hub of worm wheel 22 is splined upon the worm shaft 23. This clutch provides a manually operable means for disconnecting the driving mechanism and the valve per se to allow for manual actuation of the valve. The clutch includes a yoke 41 secured to the shaft 42 provided with an operating handle 43.

In the structure illustrated the motor 20 is carried by an annular bracket 44 secured to the housing 14 by bolts 45 which also serve to force the gland flange 46 against the packing in the stuffing box 47. The coupling sleeve 32 has an annular flange 48 which is interposed and held between the ball bearing supports 49, the latter of which are held with relation to the drive casing by means of the flange 50 and a wall of the stuffing box 47. The coupling sleeve 32 is thus held against endwise movement and serves as the bearing member for one end of the worm shaft 27 which is squared to slidably fit the correspondingly shaped bore 51. Obviously a spline or other type of slip joint connection might be employed. Sufficient clearance is provided between the end of the bore and the adjacent end of the worm shaft to permit the requisite movement of the shaft necessary to actuate the switch 31.

The sleeve or housing 33 in which the opposite end of the worm shaft 27 is mounted is composed of two sections 52 and 53 respectively provided with annular flanges 54 and 55 apertured to receive cap screws whereby this structure is secured to the housing 14. The switch arm 28 is in the present instance connected with the longitudinally movable worm shaft 27 through the medium of the rods 57 secured to the annular member 58 which is secured by means of the screws 59 to the ball bearing housing 36. This end of the worm shaft 27 is threaded as indicated at 60 to receive the nut 38 by which the tension of the spring 37 may be regulated to vary the amount of resistance to valve movement sufficient to actuate the cutout switch. A further adjustment is provided by the adjustable nuts 65 and 66 connecting the switch shoe 29 to the arm 28. By means of these two adjustments the resistance to valve movement at which the cutout switch will be actuated to stop the motor may be regulated to a fine degree of nicety.

In order to obtain a hammer blow action for initiating the movement of the valve in both directions a lost motion connection between the gear 17 and the nut 18 is provided by equipping them with cooperating lugs 63 and 62, respectively as shown in Fig. 4. A hand wheel 64 secured to the gear 17 enables the valve to be manually operated when the clutch 40 is released.

From the foregoing description it will be apparent that closing movement of the valve will be stopped whenever the valve offers, by reason of encountering an obstacle or engaging its seat, a resistance to movement greater than that for which the spring 37 is set. Injury to the operating mechanism or the motor is accordingly obviated and the adjustments described permit the resistance point at which the valve will be stopped to be regulated and adjusted to a fine degree. The extent of opening movement will also be controlled by the one way limit switch and this switch may be adjusted to bring the valve to rest in its opening movements at any desired point.

It is manifest that the clutch 40 and the mechanism for operating it, including the yoke 41, the shaft 42 and handle 43, provides a means whereby the motor operated drive mechanism may be disconnected from the valve and thereby allow manual operation of the valve independently of the driving mechanism should this be found necessary or desirable.

Having thus described the invention what I claim and desire to cover by Letters Patent is:

1. In a power operated valve opening and closing mechanism, a reversely operable motor, a shaft driven thereby, a bearing supporting said shaft, a worm and worm wheel, the shaft of said worm being in line with said first mentioned shaft, one of said shafts having an angular end portion and the other a correspondingly shaped bore in which said end portion is slidably fitted, thereby providing a positive slip drive connection between said shafts and a support for the worm shaft at one side of the worm, a bearing for said worm shaft supporting the same at the other side of the worm, said worm shaft having a thrust shoulder to abut said worm shaft bearing, said worm shaft having an extension beyond said worm shaft bearing, a swiveled member carried by said extension, a coiled spring encircling said extension compressed between said swiveled member and a fixed frame member in which the worm shaft bearing is mounted, whereby the worm shaft is urged by the spring in a direction to cause said thrust shoulder to abut against said worm shaft bearing, a positive drive connection between said worm wheel and the valve, the motion of said mechanism to open the valve being in a direction to keep said thrust shoulder of the worm shaft against said worm shaft bearing, automatic means to control the valve opening operation of the motor, said means being controlled by an element of said mechanism between the worm and valve to shut off the power when the valve in its opening movement reaches a predetermined position short of backseating, and automatic means to control the valve closing operation of said mechanism, said last named means being operable by an axial displacement of said worm against the opposition of the spring as the result of a predetermined resistance to the closing movement of the valve.

2. In a power operated valve opening and closing mechanism, a reversely operable electric motor, a shaft driven thereby, a bearing supporting said shaft, a worm and worm wheel, the shaft of said worm being in line with said first mentioned shaft, one of said shafts having an end portion slidably but non-rotatably fitted in a bore of the other, thereby providing a positive slip drive connection between said shafts and a support for the worm shaft at one side of the worm, a bearing for said worm shaft supporting the same at the opposite side of the worm, said worm shaft having a thrust shoulder to abut said worm shaft bearing, said worm shaft having an extension beyond said worm shaft member, a swiveled member carried by said extension, a coiled spring encircling said extension compressed between said swiveled member and a fixed frame member in which said worm shaft bearing is mounted, whereby the spring urges the worm in a direction to bear through said shoulder against said worm shaft bearing, a positive drive connection between said worm shaft and the valve, the motion of the mechanism for the valve opening operation being in a direction to keep said worm shaft shoulder against said worm shaft bearing, automatic means to control the valve opening operation of the motor, said means comprising a limit switch and means controlled by an element of said mechanism between the worm and valve for actuating said switch to open the motor circuit when the valve in its opening movement reaches a predetermined position short of backseating, and automatic means to control the valve closing operation of said motor, said last named means comprising a separate cut-out switch and means carried by said swiveled member on the worm shaft for mechanically actuating said switch to open said circuit when as a result of said resistance the worm is displaced against the opposition of said spring.

3. In a power operated valve opening and closing mechanism, the combination with a valve of the type which may require a greater effort to unseat than to seat it and having a valve stem provided outside the valve casing with a screw threaded portion, a reversely operable motor, a worm driven thereby, said worm being slidably mounted and there being a positive slip drive connection between the motor and worm to permit axial movement of the worm, a worm wheel in mesh with and driven by the worm, a non-yielding end thrust abutment cooperating with the worm to prevent displacement thereof from its normal operative position in the direction of the thrust imposed on the worm in the valve opening operation, a spring urging the worm in said direction and effectually resisting displacement thereof in the opposite direction, a gear in positive driving connection with said worm wheel, a revoluble nut engaging said screw threaded portion of the valve stem for actuating it to move the valve to open and closed positions, said gear being concentric with and having a positive driving connection with said nut with a limited lost motion whereby to cause a hammer blow on the nut to start the valve movement in either direction, motor controlling means operable by an element of the mechanism between the worm and nut to shut off the motive power when the valve in its opening movement reaches a predetermined position short of backseating, and other motor controlling means operable by axial displacement of said worm to shut off the motive power when in the valve closing operation a predetermined resistance is encountered sufficient to cause such displacement against the opposition of said spring, said worm when driven in the direction for opening the valve assuming said normal operative position in coactive relation with said end thrust abutment.

CLINTON H. BECKWITH.